United States Patent [19]

Inoue et al.

[11] Patent Number: 6,114,065
[45] Date of Patent: Sep. 5, 2000

[54] SECONDARY BATTERY

[75] Inventors: Kaoru Inoue; Takafumi Oura, both of Moriguchi; Masaki Kitagawa, Katano; Hizuru Koshina, Neyagawa, all of Japan

[73] Assignee: Matsushita Electric Industrial Co., Ltd., Osaka, Japan

[21] Appl. No.: 09/180,507

[22] PCT Filed: Feb. 25, 1998

[86] PCT No.: PCT/JP98/00752

§ 371 Date: Nov. 12, 1998

§ 102(e) Date: Nov. 12, 1998

[87] PCT Pub. No.: WO98/40919

PCT Pub. Date: Sep. 17, 1998

[30] Foreign Application Priority Data

Mar. 11, 1997 [JP] Japan ..................................... 9-055830

[51] Int. Cl.[7] .................................................. H01M 10/24
[52] U.S. Cl. .................................. 429/231.8; 429/231.95
[58] Field of Search .............................. 429/231.95, 231.8

[56] References Cited

U.S. PATENT DOCUMENTS

| | | | |
|---|---|---|---|
| 5,133,842 | 7/1992 | Taylor et al. .............................. | 204/98 |
| 5,759,714 | 6/1998 | Matsufuji et al. ....................... | 429/194 |
| 5,789,114 | 8/1998 | Adachi et al. ........................... | 429/232 |
| 5,856,043 | 1/1999 | Ohsaki et al. ........................... | 429/218 |

FOREIGN PATENT DOCUMENTS

| | | |
|---|---|---|
| 1-149370 | 6/1989 | Japan . |
| 5-174811 | 7/1993 | Japan . |
| 8-78003 | 3/1996 | Japan . |
| 8-78057 | 3/1996 | Japan . |
| 9-129216 | 5/1997 | Japan . |

OTHER PUBLICATIONS

Japanese language search report for Int'l Appln No. PCT/JP98/00752 dated Jun. 16, 1998.
Copy of Form PCT/ISA/210.

*Primary Examiner*—Maria Nuzzolillo
*Assistant Examiner*—Monique Wills
*Attorney, Agent, or Firm*—Ratner & Prestia

[57] ABSTRACT

A cell capable of preventing precipitation of lithium on a negative electrode plate in the final stage of a cycle life and achieving a superior cycling performance and high safety and reliability is provided. In a rechargeable secondary cell using a non-aqueous electrolyte, a positive electrode contains an active material and a conductive element, and Ketjenblack, a mixture of Ketjenblack and flake graphite or a mixture of Ketjenblack and acetylene black is employed as such conductive element.

12 Claims, 1 Drawing Sheet

SECONDARY BATTERY

This Application is a U.S. National Phase Application of PCT International Application PCT/ JP98/00752.

TECHNICAL FIELD

The present invention relates to a secondary cell having a non-aqueous electrolyte, particularly a positive electrode thereof.

BACKGROUND ART

Recently, development of portable and cordless types of such electronic apparatuses as AV equipment and personal computers has made rapid progress, and a secondary cell of small size, light weight and providing a high energy density is highly demanded as a driving power supply for such apparatus. Particularly, a secondary lithium cell with a negative electrode of metallic lithium used as an active material is highly expected to be a cell capable of providing a high voltage and a high energy density. However, because of insufficiency in safety and reliability, such lithium cell has not been practically applied for the present.

It is considered that the safety is reduced because the negative electrode of metallic lithium is changed to a dendritic shape by repetitive charging and discharging, leading to possible internal short circuiting and heat generating reaction between the electrolyte and lithium of the dendritic shape.

In order to solve the problem, a secondary lithium ion cell with a negative electrode of carbon material that is capable of reversibly intercalating and deintercalating lithium and a positive electrode of such oxide of a transition metal containing lithium as $LiCoO_2$, $LiNiO_2$ and $LiMn_2O_4$ has been suggested.

In such secondary lithium ion cell, since lithium is intercalated into the carbon material of negative electrode during charging, precipitation of lithium is theoretically never caused on the negative electrode plate, it is advantageous in that internal short circuiting of the cell is restricted, and the cell is superior in safety and reliability.

Even in the case of such secondary lithium ion cell with a negative pole of carbon material that is capable of reversibly intercalating and deintercalating lithium, however, lithium is deposited on the negative electrode plate gradually as charging and discharging are repetitively conducted, and it has been a problem that the cell is reduced in safety and reliability in the final stage of its cycle life.

Hence, it is an object of the invention to solve the problem, and provide a cell superior in charging and discharging cycle life characteristics, safety and reliability by preventing precipitation of lithium on a negative electrode plate in the final stage of cycle life.

SUMMARY OF THE INVENTION

A secondary cell according to the invention comprises a positive electrode having an active material and a conductive element, a negative electrode and an electrolyte in contact with the positive and negative electrodes, wherein the conductive element contains Ketjenblack. Ketjenblack is a kind of carbonblack powder, produced by Ketjenblack International, Inc. Ketjenblack is a carbon black having a hollow shell structure with graphite crystals accumulated outside thereof, a DBP oil absorption of about 200 ml/100 g a surface area of about 500 $m^2$/g nitrogen adsorption method, and porosity about 35% or more.

It is particularly desirable that the content of the Ketjenblack is within a range of about 0.3 parts by weight to about 1.2 parts by weight with respect to 100 parts by weight of the active material.

Another secondary cell according to the invention comprises a positive electrode having an active material and a conductive element, a negative electrode and an electrolyte in contact with the positive and negative electrodes, wherein the conductive element contains Ketjenblack and flake graphite.

It is particularly desirable that the content of the Ketjenblack is within a range of about 0.2 parts by weight to about 1.0 part by weight with respect to 100 parts by weight of the active material, and a value of $[3X+(3/8)Y]$ is within a range of about 1.0 to about 3.5 where X is the content of the Ketjenblack expressed by units of part by weight, and Y is the content of the flake graphite expressed by units of part by weight with respect to 100 parts by weight of the active material.

The other secondary cell according to the invention comprises a positive electrode having an active material and a conductive element, a negative electrode and an electrolyte in contact with the positive and negative electrodes, wherein the conductive element contains Ketjenblack and acetylene black. Ketjenblack is a carbon black powder produced by Ketjenblack International, Inc.

It is particularly desirable that the content of the Ketjenblack is within a range of about 0.2 parts by weight to about 1.0 part by weight with respect to 100 parts by weight of the active material, and a value of $[3X+Z]$ is within a range of about 1.1 to about 3.5 where X is the content of the Ketjenblack expressed by units of part by weight, and Z is the content of the acetylene black expressed by units of part by weight with respect to 100 parts by weight of the active material.

In above constitution, it is desired that the electrolyte is a non-aqueous electrolyte.

In above constitution, it is desired that the positive electrode is of a band-like shape.

In above constitution, it is desired that the positive electrode is of a band-like shape, the negative electrode is of a band-like shape, and the positive and negative electrodes are faced against each other with a separator between them, and wound in a spiral shape.

According to above constitution, the positive electrode is increased in absorbing property to the electrolyte, the electrolyte is distributed throughout the electrode in a uniform manner, a metallic material composing the active material is prevented from being deposited on a surface of the negative electrode, and a repetitive charging and discharging repetition cycle life is increased as a result.

Further, in the case both Ketjenblack and acetylene black or both Ketjenblack and flake graphite are used for the conductive material, in addition to above effect, the positive electrode is increased in strength. Ketjenblack is a carbon black powder produced by Ketjenblack International, Inc.

BEST MODE OF CARRYING OUT THE INVENTION

Figure 1:
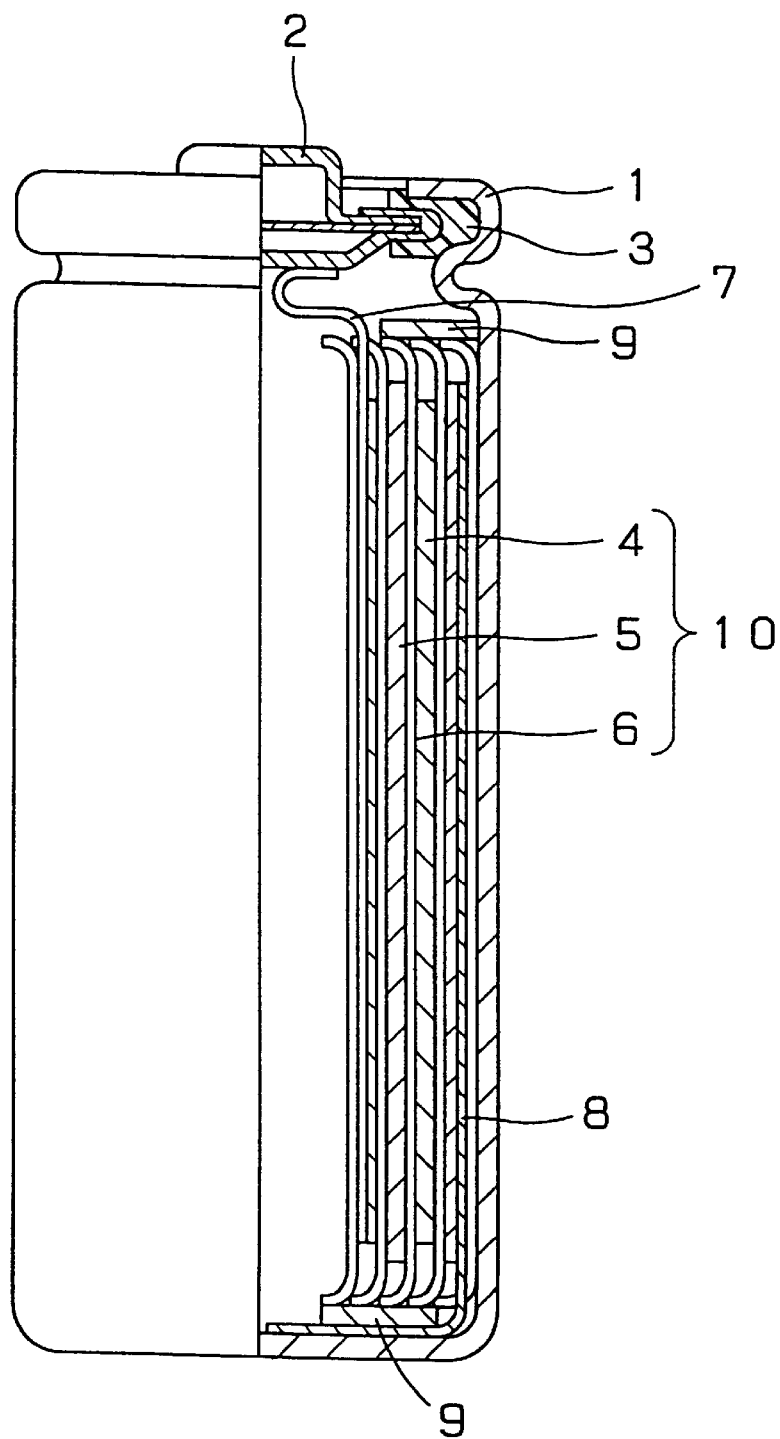
FIG. 1 is a vertical sectional view of a cylindrical cell according to an embodiment of the invention.

As an index for indicating physical property of such carbon black as Ketjenblack, a dibutyl phthalate oil absorption (DBP oil absorption) is used. Ketjenblack is a kind of carbonblack powder, and a trade mark of Ketjenblack International Company. The DBP oil absorption is considered to be in correspondence with an absorbing property to an electrolyte. In the case a carbon black of high DBP absorption is employed as a conductive element for a positive electrode, an absorbing property to an electrolyte is increased, distribution of the electrolyte in the widthwise direction of electrode plate is assured, and a repetitive charging and discharging cycling performance is increased as a result. The DBP oil absorption of Ketjenblack (EC) is at about 360 ml/100 g, that of Ketjenblack (EC600JD) is at 500 ml/100 g, and that of acetylene black is at 120 ml/100 g.

It means that Ketjenblack (EC) is superior in cycling performance, because it provides an absorbing property to an electrolyte generally similar to that of acetylene black at the amount of about ⅓ of acetylene black. In observation of a cell in the final stage of charging and discharging cycle life, a cell using Ketjenblack showed no clogging of a separator in either end of an electrode plate in the widthwise direction and no precipitation of lithium in a central part, and demonstrated superior safety and reliability. Ketjenblack is a carbon black powder produced by Ketjenblack International.

By contrast, in a cell using acetylene black, even when an absorbing property of positive electrode is increased by increasing the amount of acetylene black added thereto, a cycling performance was not increased so much as that of Ketjenblack. It is supposed to be because, in the case of acetylene black, the higher-order chain structure is destroyed due to mechanical stress during a mixing process in preparation of a compound for the positive electrode, and an absorbing property is reduced.

Such carbon black as Ketjenblack and acetylene black has various physical values and structures, and it is supposed that the DBP oil absorption as well as other various characteristics have an effect on an absorbing property to an electrolyte. In other words, it is considered that a cycling performance is increased by optimizing various characteristics of a carbon black, and assuring an absorbing property sufficient as a positive pole that is prepared by using such carbon black. Presently, Ketjenblack was only carbon black that achieved significant increase of cycling performance.

It is desirable that Ketjenblack used is characterized in that:

(1) it has a hollow shell structure with graphite crystals accumulated outside thereof, forming a thin layer;
(2) it desirably provides a DBP oil absorption of about 200 ml/100 g, more desirably 350 ml/100 g or more; and
(3) it has a surface area (nitrogen adsorption method) of about 500 $m^2/g$ or more, more desirably about 1000 $m^2/g$ or more.

Other characteristics of Ketjenblack are listed below.

(4) Iodine adsorption at 950 mg/g (about 500 mg/g or more)
(5) Volatile component at 1%
(6) pH value at 9.5
(7) Porosity at 69.3% (about 35% or more)
(8) Volatile component at 0.5%
(9) Apparent specific gravity at 150 g/l When Ketjenblack is solely used as a conductive element, it is desirable that the amount of Ketjenblack added is at about 0.3 to 1.2 parts by weight with respect to 100 parts by weight of an active material of positive electrode.

When a mixture of Ketjenblack and flake graphite is used, it is desirable that the amount of Ketjenblack added is at about 0.2 to 1.0 part by weight with respect to 100 parts by weight of an active material of positive electrode, and a value of $[3X+(\frac{3}{8})Y]$ is 1.0 or more and 3.5 or less where X is the content of Ketjenblack expressed by units of part by weight, and Y is the content of flake graphite expressed by units of part by weight. In the case of a mixture of Ketjenblack and acetylene black, it is desirable that the amount of Ketjenblack added is at about 0.2 to 1.0 part by weight with respect to 100 parts by weight of an active material of positive electrode, and a value of $[3X+Z]$ is 1.1 or more and 3.5 or less where Z is the content of acetylene black expressed by units of part by weight.

According to above contents, the amount of Ketjenblack added is controlled such that a density of an active material of positive electrode in a compound (hereinafter simply referred to as density of an active material of positive electrode) comes to be at about 3.0 o 3.5 $g/cm^3$ when an active material having a true density of about 5 $g/cm^3$ is used for the positive electrode.

As flake graphite mixed with Ketjenblack, natural graphite, artificial graphite and the like can be employed, and it is desirable in terms of electronic conductivity that the flake graphite has a particle size of about 0.1 $\mu$m to about 50 $\mu$m, particularly about 3 $\mu$m to about 10 $\mu$m.

The particle size of Ketjenblack is not specifically limited.

Now, embodiments of the invention are described below by referring to the drawings.

Exemplary Embodiment 1

In FIG. 1, a vertical sectional view of a cylindrical cell according to the embodiment is shown. In FIG. 1, a sealing plate 2 provided with a safety valve is placed in an opening of a cell case 1 made by processing a stainless steel plate that is resistant to an organic electrolyte with an insulating packing 3 between them. A positive electrode 4 and a negative electrode 5 are spirally wound plural times with a separator 6 between them, and housed in the case 1. And a positive lead 7 is extended from the positive pole 4, and connected to the sealing plate 2. A negative lead 8 is extended from the negative electrode 5, and connected to a bottom part of the cell case 1. In upper and lower parts of the plate group 10, an insulating ring 9 is respectively provided. The positive electrode 4 and negative electrode 5 are described in detail below.

$LiCoO_2$ providing an active material of the positive electrode 4 was synthesized by mixing $Li_2CO_3$ and $Co_3O_4$, and burning them at 900° C. for 10 hr. With respect to 100 parts by weight of powders of the $LiCoO_2$, Ketjenblack powder (prepared by Ketjenblack International under a trade name of Ketjenblack EC) of 0.2 parts by weight, 0.3 parts by weight, 0.5 parts by weight, 0.8 parts by weight, 1.0 part by weight, 1.2 parts by weight and 1.5 parts by weight was added and mixed therewith, respectively, and emulsified in conjunction with 7 parts by weight of a fluororesin binder in an aqueous carboxylmethyl cellulose solution to prepare pastes of respective positive electrode materials. The respective pastes were applied to both sides of an aluminum foil of 0.03 mm in thickness as a metallic plate, dried and rolled, and respective positive electrode plates of 0.18 mm thick, 51 mm wide and 420 mm long were prepared. The respective positive electrode plates obtained were dried at 250° C. In such manner, a positive electrode 4 with the metallic plate and a positive material applied to both sides of the metallic plate was prepared.

For the negative electrode 5, an artificial graphite KS44 prepared by Timcal Company was employed. With respect to 100 parts by weight of the artificial graphite, styrene/butadiene rubber of 3 parts by weight was added and mixed therewith, and emulsified in an aqueous carboxylmethyl cellulose solution to prepare a paste. The paste was applied to both side of a copper foil of 0.02 mm in thickness, dried and rolled, and a negative electrode plate of 0.18 mm thick, 53 mm wide and 450 mm long was prepared.

Then, an aluminum lead 7 was attached to the positive electrode plate, and a nickel lead 8 was attached to the negative electrode plate. The positive and negative electrode plates prepared in such manner were wound spirally with a polypropylene separator of 0.025 mm thick, 59 mm wide and 1200 mm long between them, and housed in a cylindrical cell case of 18.0 mm in diameter and 65 mm in height. As an electrolyte, a solvent prepared by mixing ethylene carbonate (EC), diethylene carbonate (DEC) and methyl propionate (MP) at the volume ratio of 30:50:20 and 1 mol/l of $LiPF_6$ solved to the solvent were used. The electrolyte was provided within the cell case, then the opening of the cell case was sealed by the sealing plate 2. In such manner, a cell A was prepared.

Exemplary Embodiment 2

Powders of $LiCoO_2$ synthesized in a manner similar to that of Embodiment 1, Ketjenblack powder, flake graphite (Product No. KS10 prepared by Timcal Company) and a fluororesin binder were emulsified in an aqueous carboxylmethyl cellulose solution, and pastes of various compositions were produced. Contents of Ketjenblack were at 0.1 part by weight, 0.2 parts by weight, 0.3 parts by weight, 0.5 parts by weight, 0.8 parts by weight and 1.0 part by weight with respect to 100 parts by weight of $LiCoO_2$. Contents of flake graphite were at 0.5 parts by weight, 1.0 part by weight, 2.0 parts by weight, 3.0 parts by weight and 4.0 parts by weight with respect to 100 parts by weight of $LiCoO_2$. Contents of the fluororesin binder were at 7 parts by weight. The paste was applied to both sides of an aluminum foil of 0.03 mm in thickness, dried and rolled to produce a positive electrode plate of 0.18 mm thick, 51 mm wide and 420 mm long. Other constructions were similar to those of Embodiment 1. In such manner, a cell B was produced.

Exemplary Embodiment 3

Powders of $LiCoO_2$ synthesized in a manner similar to that of Embodiment 1, Ketjenblack, acetylene black (prepared by Denki Kagaku Kogyo K. K.) and a fluororesin binder were emulsified in an aqueous carboxymethyl cellulose solution, and pastes of various compositions were produced. Contents of Ketjenblack were at 0.1 part by weight, 0.2 parts by weight, 0.3 parts by weight, 0.5 parts by weight, 0.8 parts by weight and 1.0 part by weight, respectively, with respect to 100 parts by weight of $LiCoO_2$. Contents of acetylene black were at 0.3 parts by weight, 0.5 parts by weight, 1.0 part by weight, 1.5 parts by weight and 2.0 parts by weight with respect to 100 parts by weight of $LiCoO_2$. Contents of the fluororesin binder were at 7 parts by weight, respectively. The pastes were applied each to both sides of an aluminum foil of 0.03 mm in thickness, dried and rolled to produce respective positive electrode plates of 0.18 mm thick, 51 mm wide and 420 mm long. Other constructions were similar to those of Embodiment 1. In such manner, a cell C was produced.

Comparative Example 100 parts by weight of powders of $LiCoO_2$ synthesized in a manner similar to that of Embodiment 1, 3 parts by weight of acetylene black and 7 parts by weight of a fluororesin binder were emulsified in an aqueous carboxymethyl cellulose solution to produce a paste. The paste was applied to both sides of an aluminum foil of 0.03 mm in thickness, then dried and further rolled, and a positive electrode plate of 0.18 mm thick, 51 mm wide and 420 mm long was produced. Other constructions were similar to those of Embodiment 1. In such manner, a cell D was produced.

Next, by using 5 pieces each of the cells that were produced to have respective compositions as described above, the impedance (1 kHz AC) was measured, and a charging and discharging cycle life test was thereafter conducted. In the charging and discharging cycle life test, cycles of charging and discharging were repeated at 20° C. in below conditions. For charging, constant voltage/constant current charging was conducted at a charging voltage of 4.2 V, limited current of 800 mA and charging time of 2 hr, and constant current discharging was conducted for discharging at a discharge current of 1200 mV and final discharge voltage of 3.0 V. Then, taking a service capacity at the 10th cycle as an initial capacity, respectively, it was determined that the final stage of cycle life was reached when the initial capacity was reduced to a half. Densities of the active materials of positive electrodes, initial capacities, impedances and a result of cycle life test are shown in Tables 1, 2 and 3.

TABLE 1

| Cell | Content of Keltenblack (parts by weight) | Density of active material of positive electrode (g/cm³) | Initial capacity (mAh) | Impedance (mΩ) | Cycle life (cycles) |
|---|---|---|---|---|---|
| A | 0.2 | 3.50 | 1350 | 100 | 600 |
|   | 0.3 | 3.38 | 1305 | 50 | 800 |
|   | 0.5 | 3.27 | 1265 | 48 | 900 |
|   | 0.8 | 3.19 | 1235 | 43 | 950 |
|   | 1.0 | 3.11 | 1200 | 40 | 970 |
|   | 1.2 | 3.00 | 1165 | 40 | 1000 |
|   | 1.5 | 2.90 | 1120 | 41 | 1100 |
| D | Acetylene black 3.0 | 3.10 | 1200 | 39 | 380 |

TABLE 2

| Cell | Content of Ketienblack (parts by weight) | Content of flake graphite | 3X + (3/8)Y | Density of active material of positive electrode (g/cm³) | Initial capacity (mAh) | Impedance (mΩ) | Cycle life (cycles) |
|---|---|---|---|---|---|---|---|
| B | 0.1 | 0.5 | 0.5 | 3.55 | 1370 | 124 | 450 |
|   |     | 1.0 | 0.7 | 3.52 | 1360 | 110 | 460 |
|   |     | 2.0 | 1.1 | 3.38 | 1305 | 78  | 455 |
|   |     | 3.0 | 1.4 | 3.33 | 1285 | 67  | 460 |
|   |     | 4.0 | 1.8 | 3.29 | 1275 | 50  | 470 |
|   | 0.2 | 0.5 | 0.8 | 3.50 | 1355 | 93  | 600 |
|   |     | 1.0 | 1.0 | 3.42 | 1320 | 51  | 610 |
|   |     | 2.0 | 1.4 | 3.34 | 1290 | 48  | 600 |
|   |     | 3.0 | 1.7 | 3.30 | 1275 | 46  | 620 |
|   |     | 4.0 | 2.1 | 3.26 | 1260 | 46  | 650 |
|   | 0.3 | 0.5 | 1.1 | 3.36 | 1300 | 48  | 800 |
|   |     | 1.0 | 1.3 | 3.33 | 1285 | 46  | 780 |
|   |     | 2.0 | 1.7 | 3.29 | 1275 | 45  | 820 |
|   |     | 3.0 | 2.0 | 3.24 | 1250 | 45  | 830 |
|   |     | 4.0 | 2.4 | 3.20 | 1240 | 43  | 820 |
|   | 0.5 | 0.5 | 1.7 | 3.30 | 1275 | 44  | 900 |
|   |     | 1.0 | 1.9 | 3.25 | 1260 | 43  | 910 |
|   |     | 2.0 | 2.3 | 3.21 | 1240 | 42  | 930 |
|   |     | 3.0 | 2.6 | 3.17 | 1225 | 40  | 920 |
|   |     | 4.0 | 3.0 | 3.12 | 1210 | 39  | 930 |

TABLE 2-continued

| Cell | Content of Ketienblack (parts by weight) | Content of flake graphite | 3X + (3/8)Y | Density of active material of positive electrode (g/cm³) | Initial capacity (mAh) | Impedance (mΩ) | Cycle life (cycles) |
|---|---|---|---|---|---|---|---|
| | 0.8 | 0.5 | 2.6 | 3.16 | 1225 | 41 | 930 |
| | | 1.0 | 2.8 | 3.14 | 1215 | 40 | 950 |
| | | 2.0 | 3.2 | 3.08 | 1190 | 39 | 940 |
| | | 3.0 | 3.5 | 3.02 | 1170 | 38 | 950 |
| | | 4.0 | 3.9 | 2.96 | 1140 | 38 | 950 |
| | 1.0 | 0.5 | 3.2 | 3.08 | 1195 | 38 | 970 |
| | | 1.0 | 3.4 | 3.05 | 1180 | 39 | 960 |
| | | 2.0 | 3.8 | 2.97 | 1140 | 38 | 960 |
| | | 3.0 | 4.1 | 2.94 | 1135 | 38 | 980 |
| | | 4.0 | 4.5 | 2.90 | 1120 | 38 | 970 |
| D | Acetylene black | 3.0 | | 3.10 | 1200 | 39 | 380 |

TABLE 3

| Cell | Content of Ketienblack (parts by weight) | Content of flake graphite | 3X + Z | Density of active material of positive electrode (g/cm³) | Initial capacity (mAh) | Impedance (mΩ) | Cycle life (cycles) |
|---|---|---|---|---|---|---|---|
| C | 0.1 | 0.3 | 0.6 | 3.55 | 1370 | 133 | 450 |
| | | 0.5 | 0.8 | 3.50 | 1355 | 110 | 460 |
| | | 1.0 | 1.3 | 3.35 | 1300 | 60 | 460 |
| | | 1.5 | 1.8 | 3.28 | 1265 | 55 | 480 |
| | | 2.0 | 2.3 | 3.25 | 1255 | 52 | 450 |
| | 0.2 | 0.3 | 0.9 | 3.45 | 1335 | 98 | 640 |
| | | 0.5 | 1.1 | 3.40 | 1315 | 49 | 600 |
| | | 1.0 | 1.6 | 3.29 | 1270 | 47 | 630 |
| | | 1.5 | 2.1 | 3.26 | 1260 | 46 | 620 |
| | | 2.0 | 2.6 | 3.21 | 1240 | 45 | 640 |
| | 0.3 | 0.3 | 1.2 | 3.34 | 1295 | 48 | 810 |
| | | 0.5 | 1.4 | 3.31 | 1280 | 48 | 820 |
| | | 1.0 | 1.9 | 3.23 | 1250 | 45 | 800 |
| | | 1.5 | 2.4 | 3.17 | 1225 | 45 | 830 |
| | | 2.0 | 2.9 | 3.14 | 1215 | 43 | 820 |
| | 0.5 | 0.3 | 1.8 | 3.29 | 1275 | 45 | 920 |
| | | 0.5 | 2.0 | 3.25 | 1260 | 43 | 940 |
| | | 1.0 | 2.5 | 3.20 | 1240 | 42 | 930 |
| | | 1.5 | 3.0 | 3.11 | 1200 | 40 | 920 |
| | | 2.0 | 3.5 | 3.03 | 1175 | 39 | 940 |
| | 0.8 | 0.3 | 2.7 | 3.18 | 1230 | 43 | 950 |
| | | 0.5 | 2.9 | 3.13 | 1210 | 42 | 950 |
| | | 1.0 | 3.4 | 3.08 | 1195 | 40 | 980 |
| | | 1.5 | 3.9 | 2.96 | 1140 | 40 | 1000 |
| | | 2.0 | 4.4 | 2.92 | 1130 | 40 | 1010 |
| | 1.0 | 0.3 | 3.3 | 3.10 | 1200 | 41 | 1020 |
| | | 0.5 | 3.5 | 3.05 | 1180 | 40 | 1000 |
| | | 1.0 | 4.0 | 2.95 | 1140 | 41 | 1030 |
| | | 1.5 | 4.5 | 2.89 | 1120 | 39 | 1030 |
| | | 2.0 | 5.0 | 2.85 | 1100 | 38 | 1020 |
| D | Acetylene black | 3.0 | | 3.10 | 1200 | 39 | 380 |

In Table 1, a cycling performance of the cell A according to the embodiment was increased in comparison with the cell D of comparison example. It is desirable that the content of Ketjenblack is within a range of about 0.3 to about 1.2 parts by weight. If the content of Ketjenblack is at 0.2 parts by weight or less, a collecting property of the positive electrode is reduced, and an impedance of the cell is increased. If the content of Ketjenblack is at 1.5 parts by weight or more, the density of active material of positive electrode in the compound of positive electrode is reduced, and a capacity of the cell was reduced to 1150 mAh or less.

In Table 2, a cycling performance of the cell B according to the embodiment was increased in comparison with the cell D of comparison example. In the case the content of Ketjenblack is at 0.1 part by weight or less, the cycling performance is not significantly increased, a collecting property of the positive electrode is reduced, and an impedance of the cell is increased. An impedance of the cell was high when a value of [3X+(3/8)Y] was below 1, where X is the content of Ketjenblack expressed by units of part by weight, and Y is the content of flake graphite expressed by units of part by weight, while the density of active material of positive electrode was reduced, and a capacity of the cell was at 1150 mAh or less when the value exceeded 3.5. Thus, a cell providing a high initial capacity, low impedance and superior cycling performance was obtained when the content of the Ketjenblack is within a range of about 0.2 parts by weight to about 1.0 parts by weight with respect to 100 parts by weight of the active material, and the value of [3X+(3/8)Y] was within a range of about 1.0 to about 3.5 where X is the content of Ketjenblack expressed by units of part by weight, and Y is the content of flake graphite expressed by units of part by weight.

In Table 3, a cycling performance of the cell C according to the embodiment is higher than that of the cell D of comparison example. When the content of Ketjenblack was at 0.1 part by weight or less, the cycling performance was not significantly increased, a collecting property of the positive electrode was reduced, and an impedance of the cell was higher. An impedance of the cell was high when a value of [3X+Z] was below 1.1 where X is the content of Ketjenblack expressed by units of part by weight, and Z is the content of acetylene black expressed by units of part by weight, while the density of active material of positive electrode was reduced, and a capacity of the cell was at 1150 mAh or less when the value exceeded 3.5. Thus, a cell providing a high initial capacity, low impedance and superior cycling performance was obtained when the content of Ketjenblack was within a range of about 0.2 to about 1.0 part by weight, and the value of [3X+Z] was within a range of about 1.0 to about 3.5 where X is the content of Ketjenblack expressed by units of part by weight, and Z is the content of acetylene black expressed by units of part by weight.

As flake graphite mixed with Ketjenblack, natural graphite, artificial graphite and the like can be employed.

Although $LiCoO_2$ was used as an active material of positive electrode in the embodiment, such chalcogenide of a transition metal containing lithium as $LiNiO_2$ and $LiMn_2O_4$ may be alternatively used, and an effect similar to that described above can be obtained in such case.

INDUSTRIAL APPLICABILITY

A cell providing a superior initial capacity and a superior repetitive charging and discharging cycling performance as well as a high safety even in the final stage of repetitive charging and discharging cycle life can be obtained.

What is claimed is:

1. A secondary cell comprising
   a positive electrode including an active material and a conductive element,
   a negative electrode and
   an electrolyte in contact with the positive and negative electrodes,
   wherein the conductive element comprises flake graphite and a carbon black having a hollow shell structure with graphite crystals accumulated outside thereof, a DBP oil absorption of about 200 ml/100 g a surface area of about 500 m$^2$/g at nitrogen adsorption method, and porosity about 35% or more, wherein the content of the carbon black is within a range of about 0.2 parts by weight to about 1.0 part by weight with respect to 100 parts by weight of the active material, and a value of 3X+(3/8)Y is within a range of about 1.0 to about 3.5 where X is the content of the carbon black expressed by units of part by weight, and Y is the content of the flake graphite expressed by units of part by weight with respect to 100 parts by weight of the active material.

2. A secondary cell of claim 1, wherein the electrolyte is a non-aqueous electrolyte.

3. A secondary cell of claim 1, wherein powders of the carbon black and powders of the active material are distributed in relation to each other, and bound together by a binder.

4. A secondary cell of claim 1, wherein the positive electrode comprises a metallic plate and a positive electrode material provide in both sides of the metallic plate, and the positive electrode material includes the carbon black and the active material that are distributed in relation to each other.

5. A secondary cell of claim 1, wherein the positive and the negative electrodes are faced against each other with a separator between them, and wound in a spiral manner.

6. A secondary cell of claim 1, wherein the active material is at least one selected from the group consisting of LiCoO$_2$, LiMn$_2$O$_4$ and LiNi$_2$O$_4$.

7. A secondary cell comprising:

a positive electrode including an active material and a conductive element, a negative electrode and an electrolyte in contact with the positive and negative electrodes, wherein the conductive element includes acetylene black and a carbon black having a hollow shell structure with graphite crystals accumulated outside thereof, a DBP oil absorption of about 200 ml/100 g a surface area of about 500 m$^2$/g at nitrogen adsorption method, and porosity about 35% or more, wherein the content of the carbon black is within a range of about 0.2 parts by weight to about 1.0 part by weight with respect to 100 parts by weight of the active material, and a value of 3X+Z is within a range of about 1.1 to about 3.5 where X is the content of the carbon black expressed by units of part by weight, and Z is the content of the acetylene black expressed by units of part by weight with respect to 100 parts by weight of the active material.

8. A secondary cell of claim 7, wherein the electrolyte is a non-aqueous electrolyte.

9. A secondary cell of claim 7, wherein powders of the carbon black and powders of the active material are distributed in relation to each other, and bound together by a binder.

10. A secondary cell of claim 7, wherein the positive electrode comprises a metallic plate and a positive electrode material provided in both sides of the metallic plate, and the positive electrode material includes the carbon black and the active material that are distributed in relation to each other.

11. A secondary cell of claim 7, wherein the negative electrode is of a band-like shape, and the positive and negative electrodes are faced against each other with a separator between them, and wound in a spiral manner.

12. A secondary cell of claim 7, wherein the active material is at least one selected from the group consisting of LiCoO$_2$, LiMn$_2$O$_4$ and LiNi$_2$O$_4$.

* * * * *